United States Patent Office 3,752,860
Patented Aug. 14, 1973

3,752,860
CARBONYLATION OF ORGANOBORANES IN THE PRESENCE OF COMPLEX METAL HYDRIDES
Herbert C. Brown, 1840 Garden St.,
Lafayette, Ind. 46012
No Drawing. Filed May 20, 1968, Ser. No. 730,653
Int. Cl. C07c 27/00, 31/00, 31/14
U.S. Cl. 260—632 R      8 Claims

ABSTRACT OF THE DISCLOSURE

Metal triorganoborane alcoholate compounds are formed by reacting triorganoborane compounds with carbon monoxide and a complex metal hydride at moderate conditions of temperature and pressure. The alcoholate compounds can subsequently be converted to alcohols and aldehydes. Alcohols are formed by hydrolyzing the alcoholate compound in a basic medium. Aldehydes are secured by oxidizing the alcoholate compound.

BACKGROUND OF THE INVENTION

(I) Field of the invention

This invention relates to novel metal triorganoborane alcoholate compounds, a process for their preparation, and processes involving their conversion to organic aldehydes and alcohols. More particularly, the invention is directed to metal triorganoborane alcoholate compounds formed by the reaction of organoborane compounds with carbon monoxide and complex metal hydrides. The alcoholate compounds thus formed can be hydrolyzed and/or oxidized to alcohols and aldehydes.

(II) Description of the prior art

Reactions involving triorganoborane compounds with carbon monoxide have been previously reported in the patent literature. Reppe et al. in U.S. 3,006,961 disclose the general reaction of carbon monoxide with triorganoborane compounds. Hillman in U.S. 3,317,580 also disclosed reactions of triorganoboranes with carbon monoxide. Hillman further discovered that certain compositional variations in the final product could be secured by conducting the carbonylation reaction in the presence of water.

SUMMARY OF THE INVENTION

Now, in accordance with the present invention, it has been discovered that the carbonylation of organoborane compounds conducted in the presence of complex metal hydrides results in the formation of metal triorganoborane alcoholate compounds which are believed to possess the following structural formula:

$$R_2BCHR$$
$$|$$
$$OM$$

wherein R designates an organic radical and M represents the monovalent metal-containing residue of the complex metal hydride employed in the reaction. The alcoholate compound can subsequently be hydrolyzed or oxidized to form either alcohols or aldehydes. The reaction for the production of the alcoholate compounds is ordinarily conducted in a solvent that will solubilize the hydride materials and at moderate temperatures and pressures. The use of a complex metal hydride in conjunction with the reported organoborane carbonylation reaction permits the carbonylation reaction to be controlled such that only one of the organo groups from the triorganoborane compound is transferred to the carbon of the carbon monoxide employed in the reaction.

The overall reactions contemplated by the instant invention are set forth below:

(I) $R_3B + CO + MH \longrightarrow R_2BCHR$
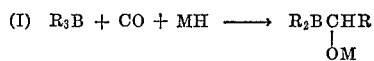

(II) $R_2BCHR + OH \xrightarrow{\text{Basic Medium}} R_2BOH + RCH_2OH$
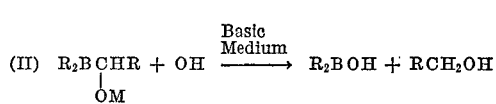

(III) $R_2BCH \xrightarrow{[O]} R_2BOH + RCHO$
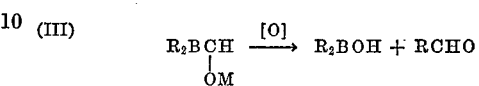

In Equation I is set forth the basic reaction for the formation of the metal triorganoborane alcoholate compound. In Equation I MH designates one equivalent of the complex hydride compound. M designates the residue of the complex hydride compound employed in the reaction. For example, if sodium borohydride were employed as the complex hydride in the reaction M would be a $NaBH_3$-radical (anhydride less one hydrogen atom). Equation II is representative of the hydrolysis of the alcoholate compound to a mono-alcohol compound and borinic acid. Lastly, Equation III illustrates the oxidation of the alcoholate compound to an aldehyde and borinic acid.

The organoborane compounds employed in the instant reaction are represented by the formula $R_3B$. In general, R designates and organic radical, preferably, a monovalent alkyl radical or monovalent aralkyl radical having from 2 to 30, preferably 2 to 10 carbon atoms. R may be an aralkyl radical or a straight chain, branched chain, cyclic or bicyclic monovalent alkyl radical. Examples of useful aralkyl radicals are radicals derived from an ethyl radical by substitution of one or more of the hydrogen atoms of the ethyl radical with phenyl or tolyl radicals or by substitution of two hydrogen atoms of the ethyl radical with one methyl radical and one phenyl or tolyl radical. Representative, non-limiting examples of the useful organoborane compounds include triethylboron, tri-n-butylboron, triisobutylboron, tri-n-octylboron, tri-n-dodecylboron, tri-n-octyldecylboron, tricyclopentylboron, tricyclohexylboron, tricyclooctylboron, tricyclododecylboron, tri-2-norbornylboron, tristyrylboron, tri-α-methylstyrylboron, etc. The value of R for a given organoborane compound may be the same or different organic moiety. Hence, compounds such as diethyl hexyl boron could be employed. The organoborane compounds are secured using techniques well known to those skilled in the art, such as, for example, through the reaction of borane or diborane with olefins.

Various types of complex metal hydrides may be employed as reagents in the alcoholate compound formation reaction. Desirable compounds contain at least two metal elements (bimetallic compounds). The preferred materials contain at least one alkali metal, e.g. sodium, lithium, or potassium. Examples of useful compounds are lithium borohydride, sodium borohydride, potassium borohydride, sodium trimethoxyborohydride, sodium triethylborohydride, lithium aluminum hydride, sodium aluminum hydride, lithium trimethoxyaluminum hydride, sodium triethylaluminum hydride.

The reagents employed in the hydrolysis of the alcoholate compounds to monoalcohols may either be water or a lower alkyl alcohol such as ethanol or isopropanol. Water is the preferred reagent. Ordinarily, the hydrolysis reaction is conducted in a basic medium, preferably, in the presence of an alkali metal hydroxide such as sodium hydroxide. In Equation III is shown the oxidation of the intermediate alcoholate compound to aldehydes. The oxidation can be completed using conventional techniques and reagents. For example, the oxidation can be conducted using sodium hypochlorite, or a peroxide such as hydrogen peroxide or with the use of an oxygen containing gas such as air. The borinic acid formed in these reactions may be converted back to a useful dialkyl boron hydride which may be recycled to the process.

Conventionally, the reaction for the formation of the metal triorganoborane alcoholate compounds is conducted in the presence of a solvent. The solvent employed should be capable of solubilizing the complex metal hydride. Dipolar aprotic solvents such as aliphatic ethers, e.g. tetrahydrofuran, diethyl ether, diglyme, ethyl butyl ether, dibutyl ether, etc.; dimethyl sulfoxide; hexamethyl phosphoramide; and the like are particularly effective. Even $H_2O$ may be used if it does not react with the complex metal hydride. Sufficient amounts of solvent should be used to assure a fluid reaction medium.

The reaction temperatures and pressures employed within the reaction zone during the course of the formation of the metal triorganoborane alcoholate compound can vary over a wide range. Temperatures varying from $-80°$ to about $160°$ C. can be used. Generally, temperatures varying from about $25°$ C. to about $60°$ C. will be employed. The pressure within the reaction zone during the formation of the alcoholate compound is not critical. Pressures ranging from one atmosphere to 1500 p.s.i. may be used. The length of the reaction period can vary depending upon the identity of the process reactants. Optimum reaction times may vary in the range of from about 30 minutes to about three or four days. Typically, carbon monoxide uptake is completed within from about 6 to 10 hours.

The hydrolysis of the alcoholate product is conducted at temperatures ranging from about 0 to $100°$ C., preferably between about 20 and $80°$ C. The oxidation reaction for the formation of aldehydes from the intermediate alcoholate product is conducted at temperatures varying from between about 0 and $100°$ C., most preferably between about 20 and $50°$ C. The oxidation and hydrolysis reactions may be conducted at atmospheric pressure.

The order of addition of the process reactants into the reaction zone is not critical. In one operation, the triorganoborane compound and the complex metal hydride are contacted with carbon monoxide by simply bubbling the carbon monoxide through the reactants. In the presence of the organoborane, rapid CO absorption occurs, one mole of carbon monoxide being used per mole of organoborane, provided an equal molar quantity of metal hydride is present (1 hydrogen equivalent per mole of organoborane). The reaction is believed to exhibit a 1:1:1 stoichiometry between the three reactants.

The alcoholate products formed with the instant reaction have many varied uses. In particular, the boron derivatives may be employed as additives for gasoline or diesel fuel. More importantly, as explained herein, the alcoholate compounds may be converted to valuable alcohol and aldehyde products which possess utility as chemical intermediates.

DESCRIPTION OF THE PREFERRED EMBODIMENT

The invention will be further understood by reference to the following examples.

Example 1

A dry 300-milliliter flask equipped with thermometer well, septum inlet and magnetic stirrer was charged with a solution of 14.2 grams (150 millimoles) of norbornene contained in 26.6 milliliters of tetrahydrofuran. Prior to introduction of the reagent, the flask was flushed with nitrogen. After reagent introduction, the flask was immersed in an ice-water bath. Hydroboration (formation of the triorganoborane compound) was achieved by adding dropwise 23.4 milliliters of a solution of 25 millimoles of diborane in tetrahydrofuran. Hydroboration was completed by stirring the mixture at room temperature for 0.5 hour.

Thereafter, 1.09 grams (50 millimoles) of lithium borohydride was added to the system and the resulting solution heated to $45°$ C. The system was then flushed with carbon monoxide and the reaction initiated by stirring the contents of the flask in the presence of carbon monoxide. After six hours, absorption of the carbon monoxide ceased and a solution of 7 grams of potassium hydroxide in 25 milliliters of absolute ethanol added. The mixture was heated for 1 hour at $70°$ C. to hydrolyze the intermediate. Then the flask was again placed in an ice-water bath and 22 milliliters of 30% hydrogen peroxide was added dropwise to the crude reaction mixture to oxidize the borinic acid by-product formed. During this oxidation the temperature of the flask was maintained at a temperature between about 30 and $35°$ C. The solution was then stirred for 1 hour and then saturated with potassium carbonate. The supernatant liquid was analyzed by gas liquid partition chromatography and a yield of 42.5 millimoles of exo-norbornylmethanol (an 85% yield based on the theoretical production of 1 mole of alcohol from 1 mole of $R_3B$) was secured.

Example 2

Following the procedure and employing the equipment of Example 1 a series of experiments were conducted wherein various olefinic materials were converted first to trialkyl boron compounds, thereafter carbonylated in the presence of lithium borohydride to form intermediate alcoholate compounds which were subsequently hydrolyzed to form alcohol products. In one reaction, ethylene was converted to 1-propanol in 80% yield. In another experiment, 1-butene was converted to 1-pentanol in 72% yield. Similarly, 1-octene was converted to 1-nonanol in 70% yield, cyclopentene converted to cyclopentylmethanol in 69% yield and cyclohexene converted to cyclohexylmethanol in 80% yield. The value of percent yield in each of the experiments was based upon a theoretical production of 1 mole of alcohol per mole of $R_3B$.

Example 3

In a reaction flask was reacted 26 milliliters of a 2.0 M solution of borane in tetrahydrofuran with a solution of 12.6 grams (150 millimoles) of 1-hexene contained in 20 milliliters of tetrahydrofuran. The mixture was stirred for 0.5 hour to assure completion of the reaction to the trihexylborane compound. Then, 55 millimoles of 2 M solution of lithium trimethoxyaluminohydride (prepared by adding 5.27 grams, 165 millimoles, of methanol to 27.5 milliliters of a 2.0 M solution of lithium aluminum hydride contained in tetrahydrofuran) was added to the reactor with the aid of a syringe. Carbonylation of the reaction mixture was initiated by flushing the system with carbon monoxide and by commencing stirring of the reaction mixture. Absorption of carbon monoxide was rapid with 50% of the calculated quantity of carbon monoxide being taken up in 5 minutes and uptake being completed in 30 minutes.

The crude reaction mixture was then flushed with nitrogen, and 100 milliliters of a $NaHPO_4$-$Na_2HPO_4$ buffer (the solution was approximately 2.7 M in each salt) was added to the system. Oxidation of the alcoholate product was achieved by the addition of 18 milliliters of a 30% solution of hydrogen peroxide. During peroxide addition, the temperature of the system was maintained at or below $25°$ C. Thereafter, the aqueous phase of the system was saturated with sodium chloride, the tetrahydrofuran layer dried over anhydrous magnesium sulfate and the resulting tetrahydrofuran solution examined for aldehyde by gas liquid partition chromatography. A 98% yield of aldehyde was thus obtained (because of the relative instability of the aldehyde product percent yield figures were determined through measurement of the amount of methylol derivative formed after reducing the aldehydes with aqueous sodium borohydride).

Example 4

Following the general procedure of Example 3, 2-butene, isobutene, cyclohexene and norbornene were converted to aldehyde products having one more carbon atom than the starting olefin. The percent yield for the 2-butene based product was 94, for the isobutene based product 91, for the cyclohexene based product 93, and 87 for the norbornene based material.

Having thus described the general nature and specific embodiments of the present invention, the true scope of the invention is now pointed out in the appended claims.

What is claimed is:

1. A process for the formation of organic alcohols which comprises contacting a triorganoborane compound having the general formula $R_3B$ wherein R is selected from the group consisting of monovalent alkyl and aralkyl radicals having from 2 to 30 carbon atoms, with carbon monoxide and a complex metal hydride in the presence of a sufficient amount of solvent to assure a fluid reaction medium and at a temperature varying from −80 to 160° C. for a time sufficient to secure a metal triorganoborane alcoholate compound and thereafter contacting said alcoholate compound in a basic medium with water or a lower alkyl alcohol at a temperature varying from 0 to 100° C. for a time sufficient to form said alcohol product.

2. The process of claim 1 wherein R is a monovalent alkyl radical having from 2 to 10 carbon atoms.

3. The process of claim 2 wherein said complex metal hydride is selected from the group consisting of sodium borohydride, lithium borohydride, and lithium trimethoxyaluminohydride.

4. The process of claim 1 wherein the complex metal hydride consists of bimetallic compounds containing at least one metal selected from the group consisting of sodium, lithium and potassium.

5. The process of claim 1 wherein the contacting of the said alcoholate compound is conducted at a temperature varying from 20 to 80° C.

6. The process of claim 5 wherein the contacting of the alcoholate compound with said alcohol or water is conducted in the presence of an alkali metal hydroxide.

7. The process of claim 6 wherein said alcoholate compound is contacted with water.

8. The process of claim 2 wherein said alcoholate compound is contacted with water in the presence of an alkali metal hydroxide at a temperature varying from 20 to 80° C. to form said alcohol product.

References Cited

UNITED STATES PATENTS

| | | | |
|---|---|---|---|
| 2,451,945 | 10/1948 | Hanford | 260—632 A |
| 2,796,443 | 6/1957 | Meyer et al. | 260—632 A X |
| 3,101,376 | 8/1963 | Brois et al. | 260—639 |

OTHER REFERENCES

Brown et al., Journ. Amer. Chem. Soc., vol. 89, pp. 2737–2740, May 1967.

Rathke et al., Journ. Amer. Chem. Soc., vol. 89, pp. 2740–2741.

BERNARD HELFIN, Primary Examiner

J. E. EVANS, Assistant Examiner

U.S. Cl. X.R.

260—502.3, 598, 599, 601 R, 606.5 B, 617, 617 F, 617 M, 618 R